(12) United States Patent
Jukic et al.

(10) Patent No.: US 11,222,652 B2
(45) Date of Patent: Jan. 11, 2022

(54) LEARNING-BASED DISTANCE ESTIMATION

(71) Applicant: Apple Inc., Cupertino, CA (US)

(72) Inventors: Ante Jukic, Los Angeles, CA (US); Mehrez Souden, Los Angeles, CA (US); Joshua D. Atkins, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 67 days.

(21) Appl. No.: 16/516,780

(22) Filed: Jul. 19, 2019

(65) Prior Publication Data

US 2021/0020189 A1 Jan. 21, 2021

(51) Int. Cl.
*G10L 25/51* (2013.01)
*G10L 15/22* (2006.01)
(Continued)

(52) U.S. Cl.
CPC ............ *G10L 25/51* (2013.01); *G10L 15/063* (2013.01); *G10L 15/16* (2013.01); *G10L 15/22* (2013.01); *G10L 25/78* (2013.01); *G10L 2015/088* (2013.01); *H04R 1/406* (2013.01); *H04R 3/005* (2013.01)

(58) Field of Classification Search
CPC ....... G10L 25/51; G10L 15/063; G10L 15/16; G10L 15/22; G10L 25/78; G10L 2015/088; H04R 1/406; H04R 3/005
See application file for complete search history.

(56) References Cited

U.S. PATENT DOCUMENTS 9,769,552 B2 9/2017 Choisel et al.
10,878,835 B1 * 12/2020 Pedruzzi ............... G10L 21/043
(Continued)

FOREIGN PATENT DOCUMENTS

CN 107507625 12/2017

OTHER PUBLICATIONS

Support Vector Regression based direction of Arrival Estimation of an Acoustic source (Year: 2021).*
(Continued)

*Primary Examiner* — Mohammad K Islam
(74) *Attorney, Agent, or Firm* — Womble Bond Dickinson (US) LLP

(57) ABSTRACT

A learning based system such as a deep neural network (DNN) is disclosed to estimate a distance from a device to a speech source. The deep learning system may estimate the distance of the speech source at each time frame based on speech signals received by a compact microphone array. Supervised deep learning may be used to learn the effect of the acoustic environment on the non-linear mapping between the speech signals and the distance using multi-channel training data. The deep learning system may estimate the direct speech component that contains information about the direct signal propagation from the speech source to the microphone array and the reverberant speech signal that contains the reverberation effect and noise. The deep learning system may extract signal characteristics of the direct signal component and the reverberant signal component and estimate the distance based on the extracted signal characteristics using the learned mapping.

18 Claims, 5 Drawing Sheets

(51) Int. Cl.
*G10L 15/16* (2006.01)
*G10L 25/78* (2013.01)
*G10L 15/06* (2013.01)
*H04R 3/00* (2006.01)
*G10L 15/08* (2006.01)
*H04R 1/40* (2006.01)

(56) References Cited

U.S. PATENT DOCUMENTS

| | | | |
|---|---|---|---|
| 11,057,398 B2 * | 7/2021 | Kaushik | H04W 4/029 |
| 2007/0061152 A1 * | 3/2007 | Doi | G06F 40/58 |
| | | | 704/277 |
| 2007/0100605 A1 * | 5/2007 | Renevey | G10L 21/0272 |
| | | | 704/201 |
| 2010/0166219 A1 * | 7/2010 | Marton | H04R 3/005 |
| | | | 381/98 |
| 2015/0058003 A1 | 2/2015 | Mohideen et al. | |
| 2015/0256956 A1 * | 9/2015 | Jensen | H04R 29/005 |
| | | | 381/56 |
| 2016/0077794 A1 | 3/2016 | Kim et al. | |
| 2016/0088160 A1 * | 3/2016 | Tan | H04M 3/568 |
| | | | 455/416 |
| 2016/0118038 A1 * | 4/2016 | Eaton | G10L 21/0208 |
| | | | 381/63 |
| 2016/0277862 A1 * | 9/2016 | Chen | G10L 21/0216 |
| 2016/0301373 A1 | 10/2016 | Herman et al. | |
| 2018/0240471 A1 * | 8/2018 | Markovich Golan | |
| | | | G10L 21/0232 |
| 2018/0254069 A1 * | 9/2018 | Klinger | G11B 27/326 |
| 2019/0080709 A1 * | 3/2019 | Wolff | H04R 5/027 |
| 2019/0297412 A1 * | 9/2019 | Hentunen | H04R 1/22 |
| 2019/0333498 A1 * | 10/2019 | Xu | G10L 25/51 |
| 2019/0362711 A1 * | 11/2019 | Nosrati | G06N 20/10 |
| 2020/0005810 A1 * | 1/2020 | Park | B25J 13/089 |

OTHER PUBLICATIONS

Sound Source Distance Estimation Using Deep Learning: An image Classification Approach (Year: 2019).*
Learning-Based Acoustic Source-Microphone Distance Estimation Using the Coherent-to-Diffuse Power Ratio; by Andreas Brendel and Walter Kellermann; 2018 IEEE 61 ICASSP 2018; 5 Pages.
Direction of Arrival Estimation and Localization of Multiple Speech Sources in Enclosed Environments, by Mikael Swartling; Blekinge Institute of Technology Doctoral Dissertation Series No. 2012:03; 187 Pages.

* cited by examiner

LEARNING-BASED DISTANCE ESTIMATION

FIELD

This disclosure relates to the field of audio communication devices; and more specifically, to digital signal processing methods designed to estimate the distance of an audio source such as a person who is speaking (talker or speaker) from an audio communication device based on the acoustic signals received by the audio communication device. Other aspects are also described.

BACKGROUND

Consumer electronic devices such as smartphones, desktop computers, laptops, home assistant devices, etc., are voice controlled digital devices that may be controlled by users issuing speech commands to the devices. For example, users may issue voice commands to the devices to make phone calls, send messages, play media content, obtain query responses, get news, setup reminders, etc.

SUMMARY

A user may issue voice commands to smartphones, smart assistant devices, or other media playback devices. Most of these devices have multiple microphones positioned closely together in an arrangement referred to as a compact microphone array. It is often desirable for the device to estimate the distance from the device to the user using the compact microphone array. For example, the device may adjust the playback volume or the response from a smart assistance device based on the estimated distance of the user from the device so that if the user is very close to the device, music or speech will not be played at a high volume. Alternatively, if the user is far away, media playback or the response from a smart assistant device may be adjusted to a. louder volume. In applications where there are multiple devices, the devices may coordinate or arbitrate among themselves to decide which one or more devices should reply to a query based on the distance from each device to the user. A device may also use the distance information for auditory signal enhancement. For example, assistive and augmented hearing devices such as hearing aids may enhance the audio signals based on the distance of the voice source.

If at least two microphone arrays are available, the distance of the voice source may be estimated using a triangulation method. For example, the device may estimate the direction of arrival (DOA) with respect to each array. If the distance between the arrays and their relative orientation is known, the distance to the audio source may be estimated using triangulation based on the estimated DOA for each array. However, this approach cannot be used for a device with a single microphone array or if the relative position of the arrays is unknown.

Another approach is to process the acoustic signals to estimate the distance from the audio source using a pair of microphones. For example, a simple classifier may be trained on a grid of measured or simulated points in an acoustic environment. Using a test signal, each microphone may estimate the distance by averaging over the whole signal and obtaining the estimated distance class. However, this approach of using a test signal may only operate in batch mode and is not suitable for "online" or real-time estimation of the distance needed by a virtual assistant program that needs to immediately respond to its detection of a trigger phrase being spoken by a user. This approach also does not model a general, possibly complex, non-linear relationship between the acoustic signal and the distance, and cannot generalize well to unseen conditions. A distance estimation method that overcomes these deficiencies is desirable.

To provide the capability to estimate distance to a voice source using a compact microphone array, a deep neural network (DNN) is disclosed. The deep learning system may estimate the distance of the active speech source at each time frame based on speech signals received by the compact microphone array. Estimating the distance on a frame-by-frame basis allows the system to be implemented online as well as on the device. In one embodiment, supervised deep learning may be used to learn the effect of the acoustic environment on the speech signals using multi-channel training data. For example, the deep learning system may capture the non-linear mapping between the acoustic features of the environment and the distance of the speech source such as the characteristics of room reverberation and their relationship to the estimated distance of the speech source. The deep learning system may learn the characteristics of the speech signal needed to estimate the distance of the speech source. Because the deep learning system is data driven, it learns to utilize information in the received speech signal that may be difficult to model analytically. The deep learning system may overcome the deficiencies of existing approaches by being capable to generalize to unseen environments.

In one embodiment, the deep learning system uses two input signals to learn the non-linear mapping between the speech signal and the distance. The direct speech signal contains the information about the signal propagation between the signal source and the microphones of the compact array. The diffuse speech signal corresponds to the reverberation component of the speech signal and possibly noise. A dereverberation system, for example based on linear prediction or deep learning, may estimate the direct speech signal and the diffuse speech signal. Both inputs are fed to a DNN to learn the distance of the speech source during training. In one embodiment, the architecture of the deep learning system may be a feed-forward architecture. In one embodiment, the feed-forward architecture may be a factorized architecture that uses both spatial and spectral information of the speech signal. In one embodiment, the architecture may be a recurrent neural network that uses gated recurrent unit (GRU) or long short-term memory (LSTM) for processing sequential frames of speech signals. In one embodiment, the architecture maybe a convolutional network to capture the temporal and spatial features of the input signals. Outputs from the deep learning network may be classification output that provides a discrete estimate of the distance (e.g. near, far) or regression output that provides a continuous estimate of the distance.

In one embodiment, an online deep learning system may be combined with online signal processing to estimate and track the distance to one or more active speech sources. The online deep learning system may contain multi-channel signal processing to process speech signals from the microphones of the compact microphone array to estimate the distance of the active speech source at each time frame in the presence of playback signals. The multi-channel signal processing may include multichannel acoustic echo cancellation to reduce the effect of playback signals output by a device, such as when a user interacts with the device during playback. The multichannel signal processing may also include noise reduction and source separation to mitigate distance estimation errors due to presence of the undesired signals such as noise and other active speaker signals. The online deep learning system may include online voice activity detector (VAD) to detect active speech. The system may track the distance of the currently active speech source in real time based on the output of the VAD to provide a smoothed distance estimate output for the active speech source. In one embodiment, the system may include a personalized voice activity detector (PVAD) to detect active speech from a specific speaker, such as the owner of the device. The system then may track the distance of the specific speaker from the device, while ignoring the other speech sources.

In one embodiment, the online deep learning system may use keywords in the speech signals to improve the accuracy of the distance estimation. The deep learning system may use a VAD or a keyword/speech recognition module to detect a keyword or a query recognition term. Based on the keyword or query recognition term, the deep learning system may estimate and track the distance of the active speech source. The distance estimate may be used by a device only after the end of the keyword or the query recognition term, such as to automatically adjust the volume of a response to the query based on the distance to the user estimated using the keyword or the query recognition term. In one embodiment, the online deep learning system may compute statistics of the distance estimated using the keyword or the query recognition term such as the mean, median, variance, a histogram analysis, etc.

A method for learning-based distance estimation of a speech source using signals received by a device is disclosed. A microphone of the device receives an audio signal that is responsive to sound from the signal source whose distance from the device is to be estimated. The method processes the audio signal to estimate a direct component of the sound from the signal source and a reverberant component of the sound from the signal source. The method also extracts signal characteristics of the direct component and the reverberant component. The method includes the learning system estimating the distance of the signal source from the device based on the extracted signal characteristics of the direct component and the reverberant component.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
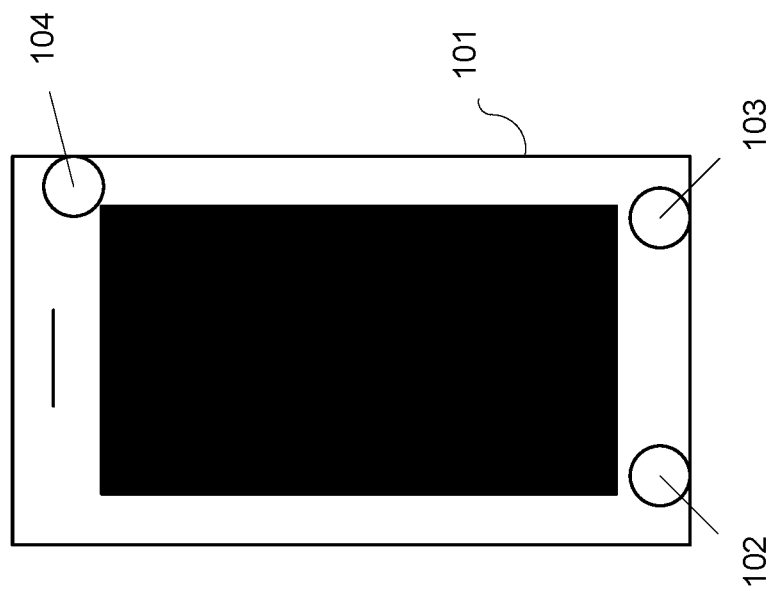
FIG. 1 depicts a scenario of a user interacting with a smartphone from a distance where the distance to the user is estimated according to one embodiment of the disclosure.
Figure 1:
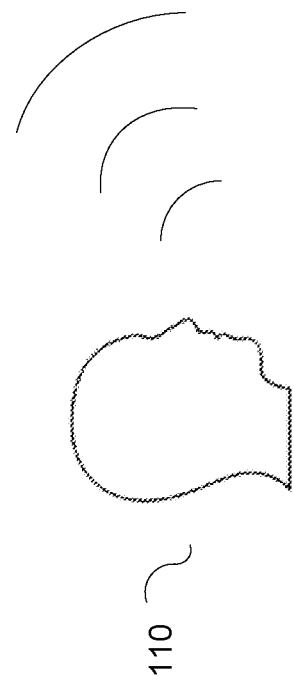

It is often desirable for the devices to estimate the distances from the devices to the users issuing the voice commands to provide a more pleasant listening experience. For example, the devices may automatically adjust the volume of media playback based on the estimated distances.

Systems and methods are disclosed for a deep learning based system such as a deep neural network (DNN) to estimate the distance of a device to an active speech source using speech signals received by a compact microphone array of the device. The DNN may operate on frame-based multi-channel input signals received by the compact microphone array to estimate and track the distances to one or more users who are the source of the speech signals as the users move about the environment. The DNN may be implemented online to leverage online processing resources and may learn the non-linear relationship between the received multi-channel speech signals and the acoustic environment when such relationship may be difficult to model analytically. In one embodiment, the DNN may use supervised deep learning of multi-channel training data to learn non-linear mapping between the distance of the speech source and the spectral and spatial features of the speech signals, spectral and spatial characteristics of the speech signals needed to estimate the distance, characteristics of reverberation of the speech signals caused by the acoustic environment used to estimate the distance, etc.

The DNN uses two components of the speech signals to learn the non-linear mapping between the speech signals and the distance. The direct speech component contains information on the direct signal propagation from the signal source to each microphone. The diffuse or reverberant speech component contains information on the indirect path and is used as an estimate of the diffuse disturbance such as reverberation and noise. The system may transform the input signals received by each microphone of the array into the time and frequency domains, estimate the direct and reverberant speech components from the time-frequency representation of the input signals, extract spectral and spatial features of the two components and the relationship between the two components, and use the extracted features of the two components to learn and estimate the distance of the speech source.

In one embodiment, the online DNN may be combined with adaptive online multi-channel signal processing to enhance the distance estimation. For example, the online multi-channel signal processing may include multi-channel echo cancellation to reduce the effect of acoustic echo when the user interacts with the device during playback from the device. The online multi-channel signal processing may include multi-channel de-reverberation and multi-channel de-noising to reduce the effects of reverberation and background noise. In one embodiment, an online distance tracking module such as Kalman filter may be used to reduce the variance of the distance estimates from the DNN. The distance tracking module may include a voice activity detector (VAD) to detect active speech. The Kalman filter may track the distance estimates when the VAD detects active speech even when the speech includes short pauses. The Kalman filter may be reset if no speech is detected for a programmable number of frames. In one embodiment, the system may include a keyword recognition system to recognize keywords or query recognition terms to estimate and track the distance to improve the accuracy of the distance estimates across the whole keyword or query. Applications running on the device may not use information about the distance estimates before the end of the keyword or the user's query. In one embodiment, the online multi-channel signal processing may compute statistics of the distance estimates.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 depicts a scenario of a user interacting with a smartphone from a distance where the distance to the user is estimated according to one embodiment of the disclosure. The smartphone 101 may include three microphones 102, 103, and 104 located at various locations on the smartphone 101. The microphones 102, 103, and 104 form a compact microphone array to receive speech signals from the user 110. For example, the user 110 may utter a query keyword such as "hey Siri" to request information from a smart assistant application. Each of the microphones may receive the speech signal with different levels of the direct speech signal, reverberant speech signal and/or background noise signal.

An online DNN-based distance estimation system may estimate the distance of the user 110 from the smartphone 101 based on the speech signals received by the microphones 102, 103, 104. The smartphone 101 may divide the received speech signals into frames and may transmit the frames of audio data to the online DNN. The DNN may use supervised deep learning of multi-channel training data to learn non-linear mapping between the distance of the speech source and the spectral and spatial features of the speech signals from each of the microphones and to learn characteristics of the speech signal including room reverberation needed to estimate the distance. The DNN may process the frames of audio data based on the learned mapping and characteristics of the room acoustics to estimate the distance to the user. The smartphone 101 may use the distance estimate to automatically adjust the volume of the response to the query from the smart assistant application. The online DNN-based distance estimation system does not rely on knowledge about the relative orientation of the microphones, but rather learns non-linear mapping between the characteristics of the speech signals and the distance, and may be generalized to unseen environments.

Figure 2:
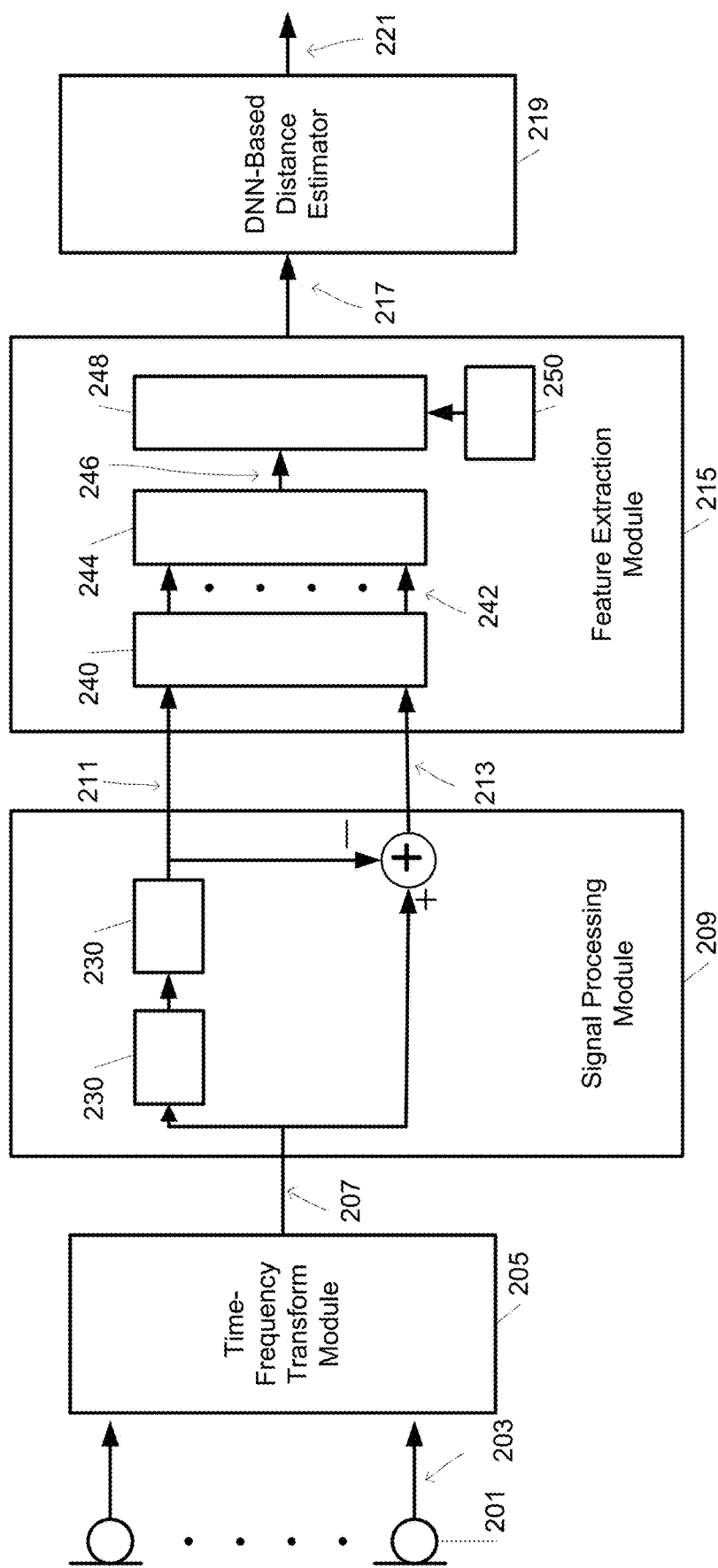
FIG. 2 is a block diagram of a deep learning system for distance estimation based on speech signals received by a compact microphone array according to one embodiment of the disclosure.

FIG. 2 is a block diagram of a deep learning system for distance estimation based on speech signals received by a compact microphone array according to one embodiment of the disclosure. Each microphone 201 of the compact microphone array receives a channel of audio signal 203, which may be speech signal from a user used to estimate distance to the user or training data used for supervised deep learning. The audio signal 203 may be divided into blocks or frames of time-domain samples.

A time-frequency transform module 205 operates on each frame of audio signal 203 to transform each channel of the input data into a time-frequency representation. The time-frequency representation may include windowed short-time Fourier transform, Gabor transform, wavelet transform or other types of multi-resolution analysis, Mel-weighted or gamma tone filter bank to provide better resolution at low frequencies, etc.

A signal processing module 209 operates on the time-frequency representation 207 of each channel to obtain an estimate of the direct signal component 211 and an estimate of the diffuse or reverberant speech component 213 of the audio signal 203. The direct signal component 211 contains the spectral and spatial information of the direct signal propagation between the speech source and the microphone 201. The diffuse or reverberant speech component 213 contains the spectral and spatial information of the diffuse disturbance such as reverberation and noise.

A feature extraction module 215 extracts characteristics of the spectral and spatial information of the direct signal component 211, those of the diffuse or reverberant speech component 213, and the relationship between the characteristics of the two components for each channel. The extracted characteristics 217 may be used for supervised training of a deep learning system or for distance estimation of the signal source using a trained deep learning system. In one embodiment, the extracted characteristics from the current time frame for all channels are concatenated. The channel-concatenated extracted characteristics of the current time frame may be concatenated in time with those from previous time frames to model the temporal dynamics of the source signal.

A DNN-based distance estimator 219 learns the non-linear mapping between the distance of the signal source and the extracted characteristics 217 of the two components of training data during supervised deep learning. Using the learned mapping, the DNN-based distance estimator 219 estimates the distance to the signal source based on the extracted characteristics 217 of the speech signal 203.

In one embodiment, the DNN-based distance estimator 219 has a feed-forward architecture. In one embodiment, the feed-forward architecture may be a factorized architecture that uses the extracted spectral and spatial characteristics of the speech signal 203. For example, a first layer may implement convolutions across channels to model spatial properties of the multi-channel input. One or more subsequent layers may implement convolutions across frequencies to model spectral properties. In one embodiment, the DNN architecture may be a recurrent neural network (RNN) that uses gated recurrent unit (GRU) or long short-term memory (LSTM) to take into account the temporal structure of the sequential frames of speech signals. In one embodiment, the DNN architecture may be a combination of feed-forward architecture and RNN or any other suitable deep learning network.

In one embodiment, the output 221 from the DNN-based distance estimator 219 may provide classification features that provide a discrete estimate of the distance (e.g. near, far) to the signal source. In one embodiment, the output 221 may provide regression features that provide a continuous estimate of the distance. In one embodiment, the cost function of the DNN-based distance estimator 219 may use cross-entropy when the output provides classification features. In one embodiment, the cost function may be mean squared error or mean absolute error when the output provides regression features. In one embodiment, the cost function may be normalized mean squared error or normalized mean absolute error for regression features with emphasis on relative accuracy.

As mentioned, the time-frequency transform module 205 transforms each frame of audio signal 203 for each channel into its time-frequency representation 207. The time-frequency representation 207 of the signal may be in fixed time and frequency resolution or in variable time and frequency resolution across the range of frequency bins and time resolution.

The signal processing module 209 processes the time-frequency representation 207 of the signal for each channel of each frame to estimate the direct signal component 211 and the diffuse or reverberant signal component 213. In one embodiment, a de-reverberation block 230 analyzes the time-frequency representation 207 of the signal to estimate the reverberation effect on the signal due to the acoustic environment. The de-reverberation block 230 may remove the reverberation effect from the time-frequency representation 207 of the signal. A de-noising block 232 may analyze the time-frequency representation 207 of the signal or the time-frequency representation 207 of the signal after signal de-reverberation to estimate the noise. The de-noising block 232 may remove the noise from the time-frequency representation 207 of the signal. The direct signal component 211 may represent the time-frequency representation 207 of the signal after de-reverberation and de-noising. The signal processing module 209 may subtract the direct signal component 211 from the time-frequency representation 207 of the signal to obtain the diffuse or reverberant signal component 213.

The feature extraction module 215 extracts features or characteristics of the spectral and spatial information of the direct signal component 211 and the diffuse or reverberant signal component 213 of the signal for each channel of each frame. In one embodiment, a feature computation block 240 computes the logarithm of the magnitude of the spectral coefficients for both components of the signal for each channel. In one embodiment, the feature computation block 240 computes the logarithm of the absolute value of the relative transfer function between the corresponding direct component or reverberant component of the channels. In one embodiment, the feature computation block 240 computes the phase of the spectral coefficients for both components of the signal for each channel. In one embodiment, the feature computation block 240 computes the phase of the relative transfer function between the corresponding direct components or between the reverberant components of the channels.

The feature computation block 240 may also compute the relationship between the features of the direct component and the reverberant component. In one embodiment, the feature computation block 240 may compute the logarithm of the direct-to-reverberant ratio (DRR) or the coherent-to-diffuse (CDR) of the spectral coefficients of the two components of the signal for each channel. In one embodiment, the feature computation block 240 may compute the linear prediction coefficients for late reverberation of each channel. The output from the feature computation block 240

The extracted features for each channel are output as a vector of feature signals 242. A feature concatenation block 244 concatenates the feature signals 242 for all channels into concatenated-channel feature signal 246. A temporal concatenation block 248 concatenates the features for the current frame with features for previous time frames delayed by the delay block 250 to model the temporal dynamics of the signal. The concatenated-frame features are output as the extracted characteristics 217 for the DNN-based distance estimator 219.

In one embodiment of the disclosure, a method of estimating the distance to the user using a deep learning system may be practiced by an online DNN-based distance estimation system of FIG. 2 in conjunction with the smartphone 101. The method may learn the non-linear mapping between the effect of the acoustic environment on the speech signal and the distance of the speech source using multi-channel training data during supervised deep learning. The deep learning system may also capture the characteristics of room reverberation and their relationship to the estimated distance of the speech source and the characteristics of the speech signal needed to estimate the distance. The deep learning system may learn the mapping by using the direct signal component containing information on the direct path from the signal source to each microphone of a compact microphone array and the reverberant signal component containing information on the indirect path. The deep learning system may have a feed-forward architecture, a recurrent neural network, any other suitable deep learning network, or combinations thereof.

The method transforms each frame of the speech signal for each channel of microphone input into a time-frequency representation. The time-frequency representation of the signal may be in fixed time and frequency resolution or in variable time and frequency resolution across the range of frequency bins and time resolution.

The method processes the time-frequency representation of the signal for each channel of each frame to estimate the direct signal component and the reverberant signal component. The direct signal component may be the time-frequency representation of the signal after estimating and removing the reverberation effect on the signal due to the acoustic environment and after estimating and removing any noise. The reverberant signal component may be the time-frequency representation of the signal after subtracting the direct signal component.

The method extracts features or characteristics of the spectral and spatial information of the direct signal component and the reverberant signal component of the signal for each channel of each frame. The method may also compute the relationship between the features of the direct signal component and the reverberant signal component. In an online system, the features from the current time frame for all input channels are concatenated. The features for the current frame may also be concatenated with the features for previous time frames to model the temporal dynamics of the signal. When more latency is allowed in the online system, future frames can also be added (look-ahead features).

The method uses the learned non-linear mapping between the characteristics of the two components of the training data and the distance of the speech source during supervised deep learning to estimate the distance of the signal source based on the extracted features of the two components of the speech signal. The output from the deep learning system may provide classification features that provide a discrete estimate of the distance (e.g. near, far) to the signal source, or regression features that provide a continuous estimate of the distance.

Figure 3:
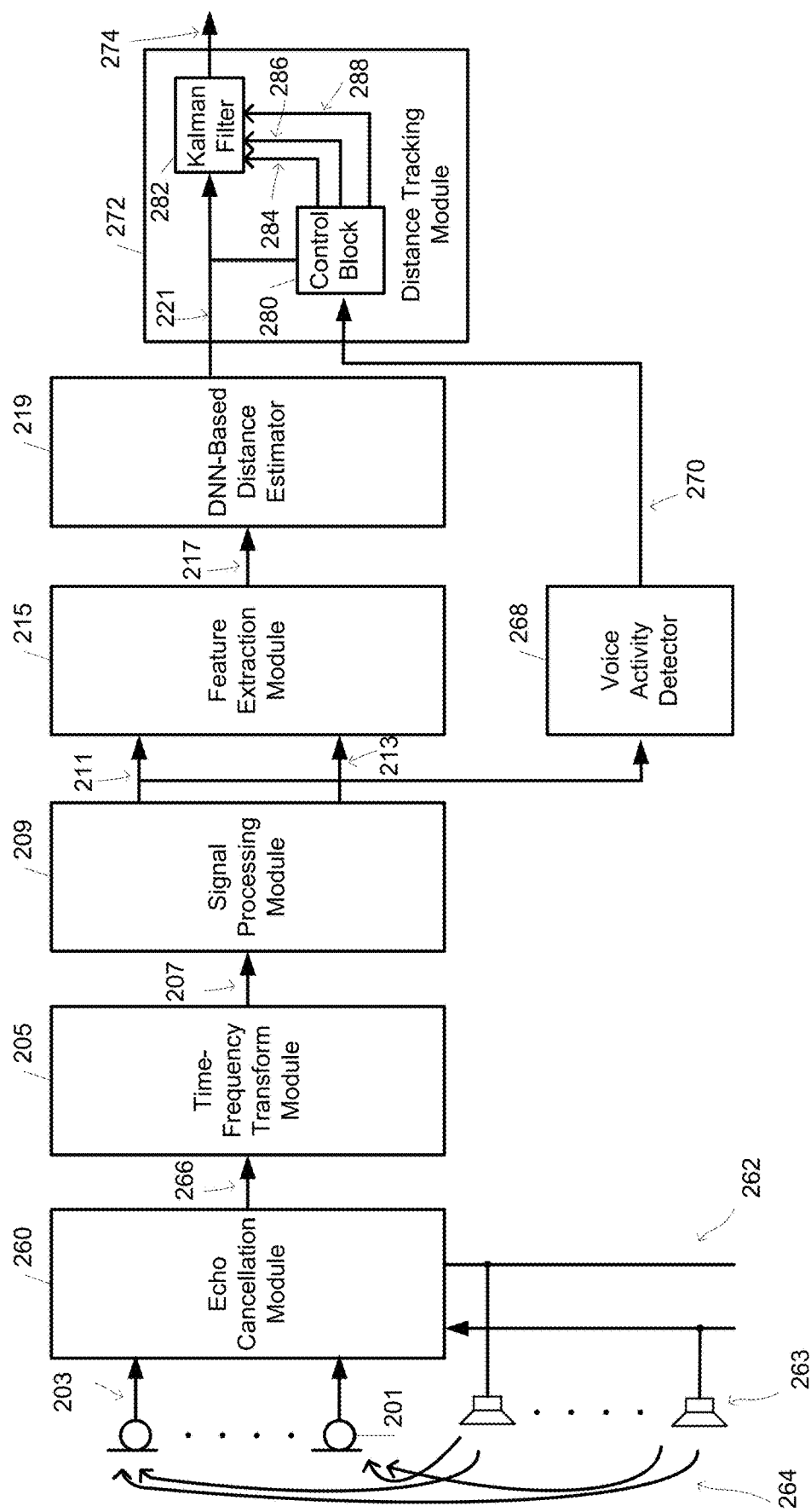
FIG. 3 is a block diagram of a deep learning system combined with signal processing to estimate and track distance to an active speech source in accordance to one embodiment of the disclosure.

FIG. 3 is a block diagram of a deep learning system combined with signal processing to estimate and track distance to an active speech source in accordance to one embodiment of the disclosure. The signal processing may be implemented online to enhance the distance estimation of the online deep learning system. Details of the deep learning system are described when discussing FIG. 2 and will not be repeated for sake of brevity.

An echo cancellation module may be used to reduce the effect of acoustic echo when a user interacts with the device during playback from the device. An array of speakers 263 of the device may receive and play audio signals 262 such as music, phone conversation, downloaded audio, synthesized speech, etc. The playback audio signals 264 from the speakers 263 may be received by the microphones 201 of the compact microphone array. When the user issues a voice command during audio playback from the speakers 263, the microphones 201 may receive the speech signal from the user as well as the playback audio signals 264. A multi-channel echo cancellation module 260 may receive the audio signals 203 from the microphones 201 and the audio signals 262 from the playback source. The echo cancellation module 260 may reduce the effect of the playback audio signals 264 by estimating the echo of the playback audio signals 264 for each input channel of the microphones 201 and subtracting the playback audio signals 264 and their estimated echo from the received audio signals 203. The echo-reduced audio signal 266 for each channel may be provided to the time-frequency transform module 205. In one embodiment, if there is no expected playback from the device or if the device lacks playback capability, the echo cancellation module 260 may be removed.

The time-frequency transform module 205 and the signal processing module 209 may operate as discussed to generate the time-frequency representation of the estimates of the direct signal component 211 and the reverberant signal component 213. A voice activity detector 268 may detect active speech on the direct signal component 211. The voice activity detector 268 may generate a voice detected signal 270 when active speech is detected.

The feature extraction module 215 may extract characteristics of the direct signal component 211 and the reverberant signal component 213 and the DNN-based distance estimator 219 may estimate the distance to the signal source based on the extracted characteristics as discussed. The DNN-based distance estimator 219 may output a distance estimate 221 for each time frame. A distance tracking module 272 may receive the distance estimate 221 from the DNN-based distance estimator 219 and the voice detected signal 270 from the voice activity detector 268 to smooth and track the estimated distance of the currently active speech source. For example, the distance tracking module 272 may reduce the variance of the frame-wise distance estimates 221 when a user issues one or more queries or commands while remaining relatively stationary.

The distance tracking module 272 may track the estimated distance during active speech as indicated by the voice detected signal 270 even when the speech includes short pauses, for example between words. However, if the voice activity detector 268 does not detect speech for a programmable number of frames, the distance tracking module 272 may restart tracking after the end of the user's query. This enables faster convergence if the user is moving between queries or if a different user is issuing a new query. The output from the distance tracking module 272 may be a smoothed estimated distance 274.

In one embodiment, the distance tracking module 272 of the deep learning system used to track and smooth estimated distance to an active speech source may include a control block 280 and a Kalman filter 282. The control block 280 receives the frame-wise distance estimate 221 from the DNN-based distance estimator 219 and the voice detected signal 270 from the voice activity detector 268 indicating active speech. The Kalman filter 282 may track the frame-wise distance estimates 221 under the control of the control block 280.

The control block 280 may configure the parameters of the Kalman filter 282 based on the frame-wise distance estimate 221 and the expected behavior of the user. For example, the control block 280 may analyze the performance of the DNN-based distance estimator 219 on a test set to generate an initial input variance 284 of the frame-wise distance estimates 221. The control block 280 may use information or assumption of the user's speed in changing positions in the room to set an innovation variance 286. The control block 280 may use the initial input variance 284 and the innovation variance 286 to configure the Kalman filter 282.

The control block 280 may detect the initial onset of the speech signal based on the voice detected signal 270 to start the Kalman filter 282. During pauses in the voice detected signal 270, the control block 280 may run a timer to count the duration of the pause during the active speech. When the duration of the pause as indicted by the timer does not exceed a programmable duration, the control block 280 may command the Kalman filter 282 to continue tracking the frame-wise distance estimates 221 when the active speech resumes. However, when the duration of the pause as indicated by the timer exceeds the programmable duration, the control block 280 may generate a reset signal 288 to reset the Kalman filter 282. Thus, the Kalman filter 282 may be reset in scenarios where the user is moving between queries or if a different user at a different location issues a new query to allow faster convergence of the smoothed estimated distance 274.

Figure 4:
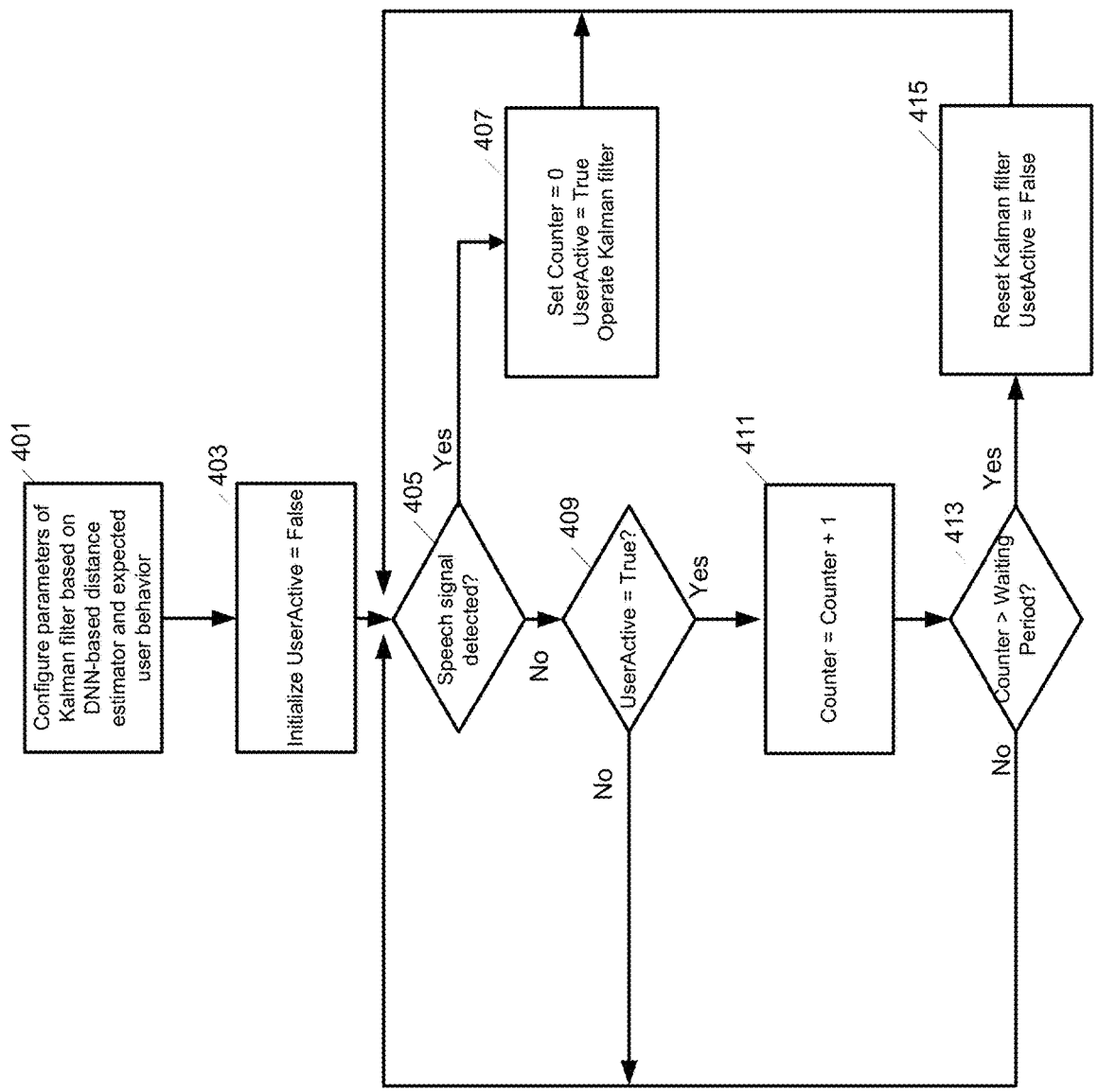
FIG. 4 is a flow diagram of a method of tracking distance to a source of active speech that may include short pauses using the distance tracking module of the deep learning system in accordance to one embodiment of the disclosure.

FIG. 4 is a flow diagram of a method 400 of tracking distance to a source of active speech that may include short pauses using the distance tracking module of the deep learning system in accordance to one embodiment of the disclosure. The method 400 may be practiced by the distance tracking module 272 of FIG. 3.

In operation 401, the method 400 configures the parameters of the Kalman filter based on the frame-wise distance estimates from the DNN-based distance estimator and the expected behavior of the user. For example, the method 400 may configure the initial input variance of the Kalman filter based on the performance of the DNN-based distance estimator on a test set and the innovation variance of the Kalman filter based on an assumption of the user's speed in changing positions.

In operation 403, the method 400 initializes a user-active flag to false to prepare for the onset of speech signal. In operation 405, the 400 determines if active speech signal is detected. For example, the method 400 may determine if it receives a voice detected signal from the VAD. If active speech signal is detected, the method 400 sets the user-active flag to true and sets a pause duration counter to 0 in operation 407. The method 400 also enables the Kalman filter to start tracking the frame-wise distance estimates from the DNN-based distance estimator.

If active speech signal is not detected in operation 405, the method 400 determines if the user-active flag has previously been set in operation 409. If the user-active flag is false, indicating that the onset of speech signal has not been received, the method returns to operation 405 to wait for the detection of active speech signal. If the user-active flag is true, indicating that there is a pause in the active speech, the method 400 suspends the tracking of the frame-wise distance estimates by the Kalman filter and increments the pause duration counter in operation 411. The pause duration counter may count the duration of the pause in frames.

In operation 413, the method 400 determines if the pause duration counter is greater than a maximum waiting period. The maximum waiting period is a programmable maximum pause duration in the active speech. The maximum waiting period may be in terms of the number of frames. If the pause duration counter is not greater than the maximum waiting period, indicating a short pause in the active speech, the method 400 returns to operation 405 to wait for the resumption of active speech signal for the Kalman filter to resume tracking the frame-wise distance estimates. If the pause duration counter is greater than the maximum waiting period, indicating that the duration of the pause has exceeded the maximum pause duration in the active speech, the method resets the Kalman filter and sets the user-active flag to false to restart the Kalman filter in operation 415. The method returns to operation 405 to wait for the onset of new active speech from the user at a different location or from a different user.

Figure 5:
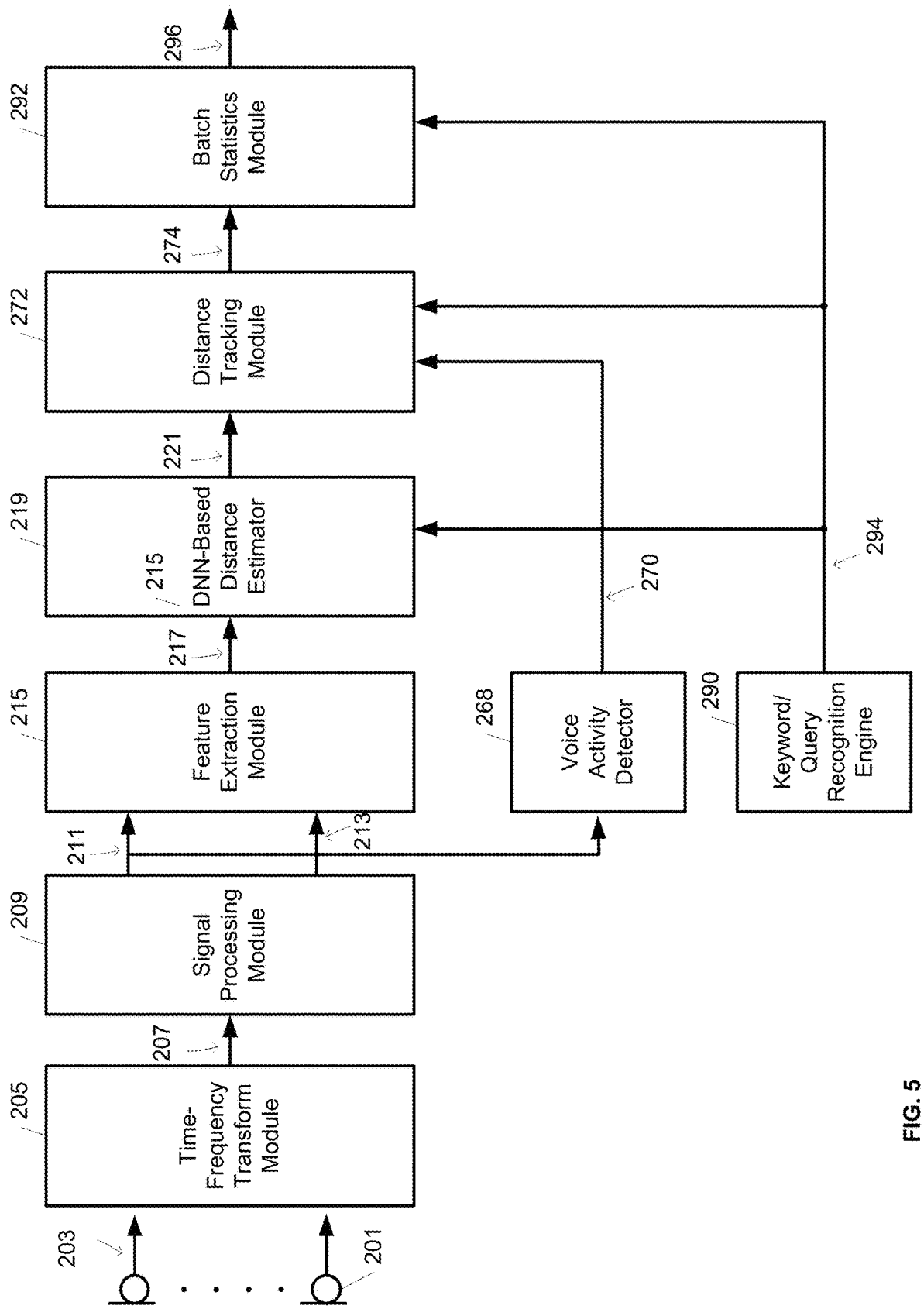
FIG. 5 is a block diagram of a deep learning system that recognizes and uses keywords to estimate distance and computes statistics of the estimated distances in accordance to one embodiment of the disclosure.

FIG. 5 is a block diagram of a deep learning system that recognizes and uses keywords to estimate distance and computes statistics of the estimated distances in accordance to one embodiment of the disclosure. The online deep learning system may use keywords in the speech signals to improve the accuracy of the distance estimation. Details of the deep learning system including the VAD 268 and the distance tracking module 272 are described when discussing FIG. 2 through FIG. 3, and will not be repeated for sake of brevity.

A keyword or query recognition engine 290 is configured to detect a keyword or a query recognition term. In one embodiment, the VAD 268 may be configured to detect the keyword or the query recognition term. The keyword or query recognition engine 290 may output a detection signal 294 based on the detected keyword or query recognition term to the DNN-based distance estimator 219 to enable estimations of the distance. The detection signal 294 may also be output to the distance tracking module 272 to enable tracking of the frame-wise distance estimates 221. In one embodiment, the device will respond after the user finishes the keyword or query and applications running on the device will not use the information about the distance before the end of the keyword or query. For example, the device may automatically adjust the volume of a response to the query based on the estimated distance to the user using the keyword or the query recognition term.

A batch statistics module 292 may receive the detection signal 294 to enable computations of statistics of the distance estimates over a batch of keyword or query recognition terms. In one embodiment, the statistics may include the mean, median, variance, myriad filtering, histogram analysis, etc., of the smoothed estimated distance 274 from the distance tracking module 272. The batch statistics module 292 may output the statistics on signal 296.

Embodiments of the deep learning system described herein may be implemented in a data processing system, for example, by a network computer, network server, tablet computer, smartphone, laptop computer, desktop computer, other consumer electronic devices or other data processing systems. In particular, the operations described for the deep learning system are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method of estimating a distance from a device to a signal source using a deep learning system, the method comprising:
   receiving an audio signal, produced by a microphone of the device, that is responsive to sound from the signal source whose distance from the device is to be estimated;
   processing the audio signal to estimate a direct component of the sound from the signal source, and a reverberant component of the sound from the signal source;
   extracting signal characteristics of the direct component and the reverberant component;
   detecting whether the audio signal includes an active speech signal or a pause in the active speech signal;

estimating, by the deep learning system, the distance of the signal source from the device based on the extracted signal characteristics of the direct component and the reverberant component during a duration of the active speech signal;

suspending the estimating of the distance responsive to the pause detected in the active speech signal;

counting an interval of the pause until the active speech signal resumes; and resuming the estimating of the distance when the interval of the pause is less than a maximum interval.

2. The method of claim 1, wherein the processing the audio signal to estimate a direct component and a reverberant component of the sound comprises transforming the audio signal into a time-frequency representation of the audio signal and wherein the direct component and the reverberant component are in time-frequency representation.

3. The method of claim 2, wherein the extracting signal characteristics of the direct component and the reverberant component comprises calculating spectral characteristics of the time-frequency representation of the direct component and the reverberant component.

4. The method of claim 2, wherein the extracting signal characteristics of the direct component and the reverberant component comprises calculating a ratio between the signal characteristics of the direct component and the signal characteristics of the reverberant component.

5. The method of claim 1, further comprising dividing the audio signal into a plurality of audio frames, and wherein the processing the audio signal to estimate a direct component and a reverberant component of the sound comprises processing the plurality of audio frames to estimate the direct component and the reverberant component for each of the plurality of audio frames.

6. The method of claim 5, wherein the estimating, by the deep learning system, the distance of the signal source from the device based on the extracted signal characteristics of the direct component and the reverberant component comprises estimating the distance for each of the plurality of audio frames and wherein the method further comprises:

tracking the distance estimated by the deep learning system during a duration of the active speech signal.

7. The method of claim 6, wherein the detecting that the audio signal from the signal source is an active speech signal comprises recognizing a keyword, and wherein the method further comprises computing statics of the tracked distance estimated by the deep learning system when the keyword is recognized.

8. The method of claim 1, wherein the distance estimated by the deep learning system comprises one of a classification output that provides a discrete estimate of the distance from the device to the signal source or a regression output that provides a continuous estimate of the distance from the device to the signal source.

9. The method of claim 1, further comprising training the deep learning system using training data to learn a mapping between audio signals of the training data received by the microphone of the device and a distance to a source of the training data, and wherein estimating, by the deep learning system, the distance of the signal source from the device based on the extracted signal characteristics of the direct component and the reverberant component comprises estimating the distance based on the learned mapping.

10. A system configured to learn and estimate a distance from a device to a signal source comprising:

a processor; and a memory coupled to the processor to store instructions, which when executed by the processor, cause the processor to:

receive an audio signal, produced by a microphone of the device, that is responsive to sound from the signal source whose distance from the device is to be estimated;

process the audio signal to estimate a direct component of the sound from the signal source and a reverberant component of the sound from the signal source;

extract signal characteristics of the direct component and the reverberant component;

detect whether the audio signal includes an active speech signal or a pause in the active speech signal;

estimate the distance of the signal source from the device based on the audio signal being detected as the active speech signal, and the extracted signal characteristics of the direct component and the reverberant component based on a learned mapping between an audio signal received by the microphone of the device from a training signal source and a learned distance from the device to the training signal source;

suspend estimating the distance responsive to the pause detected in the active speech signal;

count an interval of the pause until the active speech signal resumes; and resume estimating the distance when the interval of the pause is less than a maximum interval.

11. The system of claim 10, wherein to process the audio signal to estimate a direct component of the sound from the signal source and a reverberant component of the sound from the signal source, the processor executes the instructions stored in the memory to transform the audio signal into a time-frequency representation of the audio signal and wherein the direct component and the reverberant component are in time-frequency representation.

12. The system of claim 11, wherein to extract signal characteristics of the direct component and the reverberant component, the processor executes the instructions stored in the memory to calculate spectral characteristics of the time-frequency representation of the direct component and the reverberant component.

13. The system of claim 10, wherein the processor further executes the instructions stored in the memory to divide the audio signal into a plurality of audio frames, and wherein to process the audio signal to estimate a direct component and a reverberant component of the sound of the sound from the signal source, the processor executes the instructions stored in the memory to process the plurality of audio frames to estimate the direct component and the reverberant component for each of the plurality of audio frames.

14. The system of claim 13, wherein to estimate the distance of the signal source from the device based on the extracted signal characteristics of the direct component and the reverberant component, the processor executes the instructions stored in the memory to:

track the distance estimated by the system during a duration of the active speech signal.

15. The system of claim 14, wherein to detect that the audio signal from the signal source is an active speech signal, the processor executes the instructions stored in the memory to recognize a keyword, and wherein the processor further executes the instructions stored in the memory to compute statics of the tracked distance estimated by the system when the keyword is recognized.

16. The system of claim 10, wherein the distance estimated by the system comprises one of a classification output that provides a discrete estimate of the distance from the device to the signal source or a regression output that provides a continuous estimate of the distance from the device to the signal source.

17. A non-transitory computer-readable medium having instructions stored therein, which when executed by a processor, cause the processor to perform operations, the operations comprising:

receiving an audio signal, produced by a microphone of the device, that is responsive to sound from the signal source whose distance from the device is to be estimated;

processing the audio signal to estimate a direct component of the sound from the signal source and a reverberant component of the sound from the signal source;

extracting signal characteristics of the direct component and the reverberant component;

detecting whether the audio signal includes an active speech signal or a pause in the active speech signal;

estimating the distance of the signal source from the device based on the audio signal being detected as the active speech signal, and the extracted signal characteristics of the direct component and the reverberant component based on a learned mapping between an audio signal received by the microphone of the device from a training signal source and a learned distance from the device to the training signal source;

suspending estimating the distance during the pause detected in the active speech signal;

counting an interval of the pause until the active speech signal resumes; and resuming estimating the distance when the interval of the pause is less than a maximum interval.

18. The non-transitory computer-readable medium of claim 17, wherein the operation of processing the audio signal to estimate a direct component of the sound from the signal source and a reverberant component of the sound from the signal source comprises transforming the audio signal into a time-frequency representation of the audio signal and wherein the direct component and the reverberant component are in time-frequency representation.

* * * * *